UNITED STATES PATENT OFFICE.

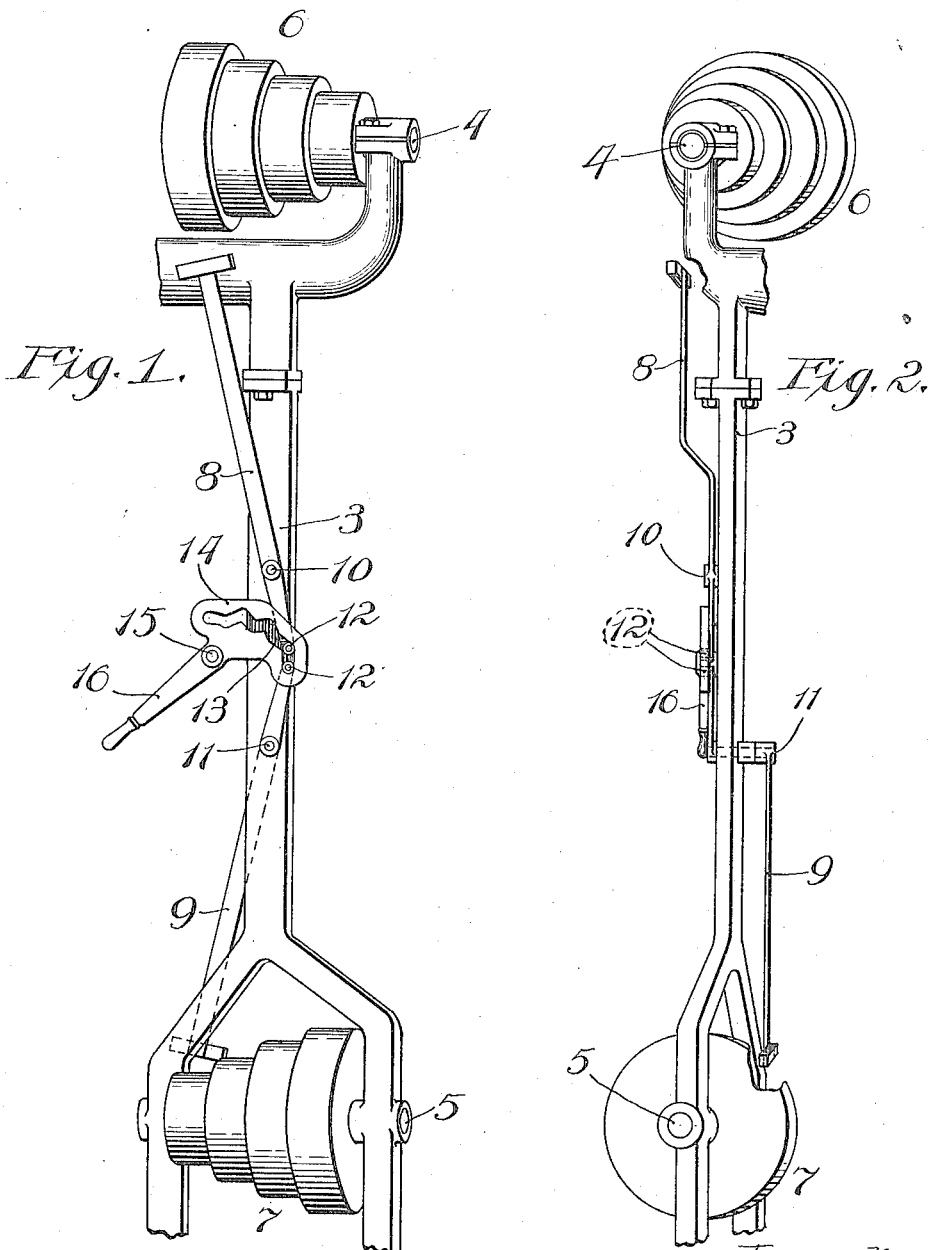

HARRY B. NEWTON AND CHARLES A. THELANDER, OF ROCKFORD, ILLINOIS, ASSIGNORS TO ROCKFORD DRILLING MACHINE COMPANY, OF ROCKFORD, ILLINOIS, A CORPORATION OF ILLINOIS.

BELT-SHIFTER.

1,180,067.  Specification of Letters Patent.  Patented Apr. 18, 1916.

Application filed December 14, 1915. Serial No. 66,690.

*To all whom it may concern:*

Be it known that we, HARRY B. NEWTON and CHARLES A. THELANDER, both citizens of the United States, residing at Rockford, in the county of Winnebago and State of Illinois, have invented certain new and useful Improvements in Belt-Shifters, of which the following is a specification.

This invention is designed for use primarily in connection with stepped cone pulleys; and the object of the invention is to automatically shift the belt step by step on each of two companion pulleys, and to make adequate provision for initially securing the necessary slack by partially stepping down the belt at one end before bringing the companion shifting lever into position to step the belt up at the other end. In other words, the companion shifting levers automatically act in succession, rather than simultaneously, to effect each shifting movement.

The mechanism of the present invention is designed to easily and automatically effect the results above noted, and to afford a safe and convenient mechanism which can be operated by hand from any convenient position.

In the drawings: Figure 1 is a side elevation of the belt shifting mechanism of the present invention; and Fig. 2 is an edge elevation of the same.

The shifting mechanism of the present invention, as shown, is mounted upon a bracket frame 3 carrying upper and lower pulley shafts 4 and 5, upon which are mounted reversely arranged upper and lower stepped cone pulleys 6 and 7 respectively. It will be understood, however, that the operating parts of the present invention can be mounted upon any suitable and convenient mounting afforded by the mechanism or machine to which the invention is applied.

The opposite ends of the belt are shifted by means of an upper shifting arm 8 and a lower shifting arm 9, mounted to swing upon pivots 10 and 11 respectively. The inner and outer ends of the arm 9 are offset through the pivot 11, so that the acting outer end of the arm 9 will occupy a position to the rear of the bracket frame 3, the shifting arm 8 occupying a position to the front of the frame. The plane of movement of each of the arms is substantially parallel with the stepped surface of the respective pulleys and at an angle of about fifteen degrees with respect to the centers of the pulley shafts, which is desirable in order to carry the belt in parallelism with the surfaces of the pulleys.

The inner end of each of the arms is provided with an outstanding roller 12, which rollers enter a zigzag cam slot 13 in a cam plate 14, turning upon a pivot 15 and controlled by means of a hand lever 16 outwardly projecting within convenient reach of the operator. The outer end of the cam slot 13 extends for a short distance in a direction substantially coincident with an arc struck from the center of the pivotal mounting 15, from which point the slot takes a sharp bend inward toward the pivotal mounting, and thence extends upward, and so on, as shown in Fig. 1, giving to the entire slot somewhat the formation of the letter M somewhat distorted and extended.

It will be noted that the sections of the slot run alternately toward the pivot 15, with the intermediate sections running substantially in parallelism with arcs of decreasing radius struck from the pivotal center 15, and that the spacing of the rollers 12 is such that they will occupy positions in each case at the inner and outer ends of the respective cam slot sections. With the parts in this position, it will be noted that an upward movement of the hand lever 16 will cause an immediate inward movement of the inner end of the upper arm 8, but will defer a movement of the arm 9 until the cam slot has moved sufficiently to bring the lower roller into the relative position initially occupied by the upper roller, after which the sharp bend or angle in the cam slot will act upon the lower roller and impart an inward movement to the inner end of the lower shifting arm 9. The cam slot is thus divided into an alternate series of acting and non-acting sections, the non-acting sections being arranged at a decreasing radial distance from the center of movement, and the active sections at a sharp angle thereto, with the result that the down-stepping shifting arm will in each instance act in advance of the up-stepping shifting arm, in order to afford the necessary initial slack at one end of the belt to permit it to be stepped up at the other end. This relative action will take place irrespective of the direction of movement of the shifting arms, and irrespective of which of the arms is acting for the time being as the up-stepping or down-stepping arm.

It will be seen from the foregoing description that the invention is extremely simple in construction; that it is fool-proof in operation; and that the arrangement is one which adapts itself to stepped pulley wheels having an indefinite number of steps, and irrespective of variation in the relative diameters of the pulley sections. In any case the cam slot can be cut to proper dimensions to fit the conditions encountered.

We claim:

1. In belt shifting mechanism, in combination with reversely arranged cone pulleys, a pivoted shifting arm for each of the pulleys, a cam plate pivoted adjacent to the inner ends of the respective arms and provided with a zigzag cam slot therein, comprising alternate active and inactive sections, a member on each of the arms, entered into said slot, and means for pivotally moving the cam plate to bring the said members successively to position within the active and non-active sections of the cam slot, to the end that the down-stepping shifting arm on each adjustment may act in advance of the up-stepping shifting arm, substantially as described.

2. In belt shifting mechanism, in combination with reversely arranged stepped pulleys, a shifting arm for each of the pulleys, pivoted at an intermediate point to constitute a lever of the first order, a cam plate pivoted adjacent to the inner ends of the respective levers and provided with a zigzag cam slot comprising alternate active and inactive sections extending in zigzag relation toward the pivotal center of the cam plate, a member on the inner end of each of the shifting arms and entered into the cam slot, and a hand lever for pivotally moving the cam plate, the arrangement being one which serves to bring said slot engaging members successively within the influence of the active and non-active sections of the cam slot for actuating the down-stepping arm in each adjustment in advance of the up-stepping arm, substantially as described.

HARRY B. NEWTON.
CHAS. A. THELANDER.

Witnesses:
BLAKEMAN EARLY,
H. GERTRUDE ERICKSON.

Copies of this patent may be obtained for five cents each, by addressing the "Commissioner of Patents, Washington, D. C."